US009789746B2

United States Patent
Levin et al.

(10) Patent No.: US 9,789,746 B2
(45) Date of Patent: Oct. 17, 2017

(54) ADSORPTION AIR-CONDITIONING SYSTEM

(71) Applicant: Ford Global Technologies, LLC, Dearborn, MI (US)

(72) Inventors: Michael Levin, Ann Arbor, MI (US); Furqan Zafar Shaikh, Troy, MI (US); Danrich Henry Demitroff, Okemos, MI (US); Lawrence Marshall, Saint Clair Shores, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 557 days.

(21) Appl. No.: 14/225,316

(22) Filed: Mar. 25, 2014

(65) Prior Publication Data
US 2015/0273974 A1    Oct. 1, 2015

(51) Int. Cl.
*F25B 15/00*    (2006.01)
*F25B 17/00*    (2006.01)
(Continued)

(52) U.S. Cl.
CPC ........... *B60H 1/005* (2013.01); *B60H 1/3201* (2013.01); *F25B 17/00* (2013.01); *F25B 17/08* (2013.01);
(Continued)

(58) Field of Classification Search
CPC ....... B60H 1/005; B60H 1/3201; F25B 17/00; F25B 17/08; F25B 27/02; F25B 29/006;
(Continued)

(56) References Cited

U.S. PATENT DOCUMENTS

| | | | | |
|---|---|---|---|---|
| 5,005,371 | A | * | 4/1991 | Yonezawa ............... F24D 11/02 165/10 |
| 5,775,126 | A | * | 7/1998 | Sato ........................ F25B 17/08 62/480 |
| 7,497,089 | B2 | | 3/2009 | Kakiuchi et al. |
| 2002/0088246 | A1 | * | 7/2002 | Bureau .............. B60H 1/00321 62/434 |

(Continued)

FOREIGN PATENT DOCUMENTS

WO    2012085605 A1    6/2012

OTHER PUBLICATIONS

"AQSOA adsorption chiller," Mitsubishi Plastics, http://www.mpi.co.jp/english/products/building_equipment/be005.html, Accessed Feb. 17, 2013, 5 pages.

*Primary Examiner* — Joseph Trpisovsky
(74) *Attorney, Agent, or Firm* — Julia Voutyras; McCoy Russell LLP

(57) ABSTRACT

An air-conditioning system which may be included in a motor vehicle may include a single pair of tube-and-plate heat exchangers arranged within a common vacuum enclosure, the heat exchangers selectively coupled with a heat source, a radiator, and an air-conditioning core. During an adsorbing/evaporating mode, coolant may circulate between a first heat exchanger and the radiator and vapor may evaporate from the surface of non-adsorbent-coated plates of the second heat exchanger and be adsorbed at adsorbent-coated plates of the first heat exchanger while coolant circulates between the second heat exchanger and the core. During a desorbing/condensing mode, coolant may circulate between a heat source and the first heat exchanger to effect desorption of vapor from the adsorbent in the first heat exchanger, while melting PCM in the core exchanges heat with air blown through the core to provide cooling.

20 Claims, 11 Drawing Sheets

(51) Int. Cl.
*F25B 27/00* (2006.01)
*F25B 19/00* (2006.01)
*B60H 1/00* (2006.01)
*F25B 27/02* (2006.01)
*F25B 29/00* (2006.01)
*F25B 17/08* (2006.01)
*B60H 1/32* (2006.01)
*F25B 30/04* (2006.01)

(52) U.S. Cl.
CPC ............ *F25B 27/02* (2013.01); *F25B 29/006* (2013.01); *F25B 30/04* (2013.01); *Y02B 30/52* (2013.01)

(58) Field of Classification Search
CPC ............. F25B 30/04; F28D 2021/0085; F28D 2020/0078
USPC ...... 62/101, 103, 105, 106, 238.3, 268, 269, 62/270
See application file for complete search history.

(56) References Cited

U.S. PATENT DOCUMENTS

| | | | |
|---|---|---|---|
| 2006/0101847 A1* | 5/2006 | Henning | F25B 17/08 62/480 |
| 2008/0066473 A1* | 3/2008 | Henning | B60H 1/3201 62/101 |
| 2009/0025403 A1 | 1/2009 | Kakiuchi et al. | |
| 2010/0065244 A1* | 3/2010 | Yokoyama | F28D 1/05383 165/10 |
| 2013/0192281 A1 | 8/2013 | Nam et al. | |

\* cited by examiner

ADSORPTION AIR-CONDITIONING SYSTEM

FIELD

The present description relates generally to air-conditioning systems including a single pair of adsorbing/desorbing heat exchangers selectively coupled with a radiator and an air-conditioning core containing phase changing materials, and corresponding methods for their use.

BACKGROUND/SUMMARY

In some motor vehicle climate control systems, a thermal-adsorption heat pump may be used instead of a compressor-driven heat pump. Thermal-adsorption heat pumps use an adsorbent chemical (e.g. zeolite, silica gel, activated carbons) rather than a mechanical compressor, and are driven by thermal energy (such as waste exhaust heat) rather than mechanical work.

One cycle of operation of a thermal-adsorption heat pump includes the adsorption of a refrigerant, e.g. water, onto adsorbent material, e.g. zeolite (during what is referred to herein as "adsorbing mode"), and the subsequent desorption of the refrigerant from the adsorbent (during what is referred to herein as "desorbing mode"). During the adsorbing mode, the adsorbent is actively cooled to effect the adsorption, for example via coolant circulating in tubes thermally coupled with the adsorbent. The cooling of the adsorbent creates suction, which draws vaporized refrigerant onto the adsorbent.

Typically, thermal-adsorption heat pumps include two adsorber chambers which alternate between adsorption and desorption, and which are thermally coupled with a dedicated condenser and evaporator. For example, US 2008/0066473 describes an adsorption heat pump for providing air conditioning to a motor vehicle having two adsorber chambers, which are each connected to a condenser and an evaporator. Both of the adsorber chambers are coated with a sorbent. The adsorber chambers, condenser, and evaporator are enclosed by a vacuum shell. The system achieves quasi-continuous air conditioning by operating such that the first adsorber chamber is adsorbed or desorbed alternately, and simultaneously the second adsorber chamber is desorbed or adsorbed, respectively. During adsorption of an adsorber chamber, the adsorber chamber communicates with the evaporator but not the condenser, whereas during desorption of an adsorber chamber, the adsorber chamber communicates with the condenser but not the evaporator. The adsorption heat pump is driven by engine waste heat, and operates in conjunction with one or more of an air cooler, recooling unit, and heat pipe(s), depending on the embodiment, to provide cooling to the passenger cabin.

In other conventional air-conditioning systems, two pairs of heat exchangers may be used, where one pair of heat exchangers is operated in a desorbing mode while the other pair is operating an in adsorbing mode. The pair operating in the adsorbing mode at a given time provides cooling.

In contrast with the above-described systems, the inventors herein have identified an air-conditioning system incorporating a thermal-adsorption heat pump which does not require a dedicated evaporator and condenser, and which does not require two pairs of heat exchangers. That is, the inventors herein have recognized that a first heat exchanger comprising adsorbent material may fluidly communicate with a second heat exchanger not comprising adsorbent material inside a vacuum enclosure, and the second heat exchanger may perform the same functionality as a dedicated evaporator and condenser when used in conjunction with a radiator and an air-conditioning core comprising phase changing materials. In one example, a method for an air-conditioning system includes, during engine operation, alternating between a desorbing/condensing mode and an adsorbing/evaporating mode. The desorbing/condensing mode, which is alternatively referred to as simply a desorbing mode herein for the sake of brevity, comprises circulating coolant between an engine waste heat recovery system and a first adsorbing/desorbing heat exchanger while circulating coolant between a radiator and a second heat exchanger, whereas the adsorbing/evaporating mode, which is alternatively referred to as simply a adsorbing mode herein for the sake of brevity, comprises circulating coolant between the radiator and the first heat exchanger while circulating coolant between an air-conditioning core comprising phase changing materials and the second heat exchanger. Accordingly, during the adsorbing mode, the radiator supplies ambient-temperature coolant to the first heat exchanger, which effects adsorption of vapor at the adsorbent material in the first heat exchanger and corresponding suction of vapor from the second heat exchanger to the first heat exchanger. Suction of vapor at the second heat exchanger cools the coolant circulating between the second heat exchanger and the air-conditioning core, such that a blower may push ambient or recirculated air past the air-conditioning core to the cabin to cool the cabin. Meanwhile, the phase changing materials in the air-conditioning core freeze. In contrast, during the desorbing mode, waste heat supplies hot coolant to the first heat exchanger, which causes the adsorbent material to release (desorb) vapor, which then condenses in the second heat exchanger. The heat of condensation is transferred from the second heat exchanger to the radiator via coolant and rejected to the environment. In the air-conditioning core, melting phase changing materials exchange heat with ambient or recirculated air, and the cooled air is directed to the cabin. Thus, a special technical effect of the air-conditioning system described herein is the ability to provide cooling using a single pair of thermally-driven heat exchangers in conjunction with an air-conditioning core incorporating phase changing materials and without the need for a dedicated evaporator and condenser.

In addition to other advantages associated with non-compressor-driven air-conditioning systems (e.g., reduction of air-conditioning accessory loads), providing air conditioning in the manner described above may reduce costs by reducing the size of the air-conditioning system (e.g., as the system does not include a dedicated evaporator and condenser or a second pair of heat exchangers). Further, control may be simplified relative to systems requiring two pairs of heat exchangers.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

The following description relates to systems and methods for providing air conditioning, e.g. to passenger cabin of a motor vehicle.

Figure 1:
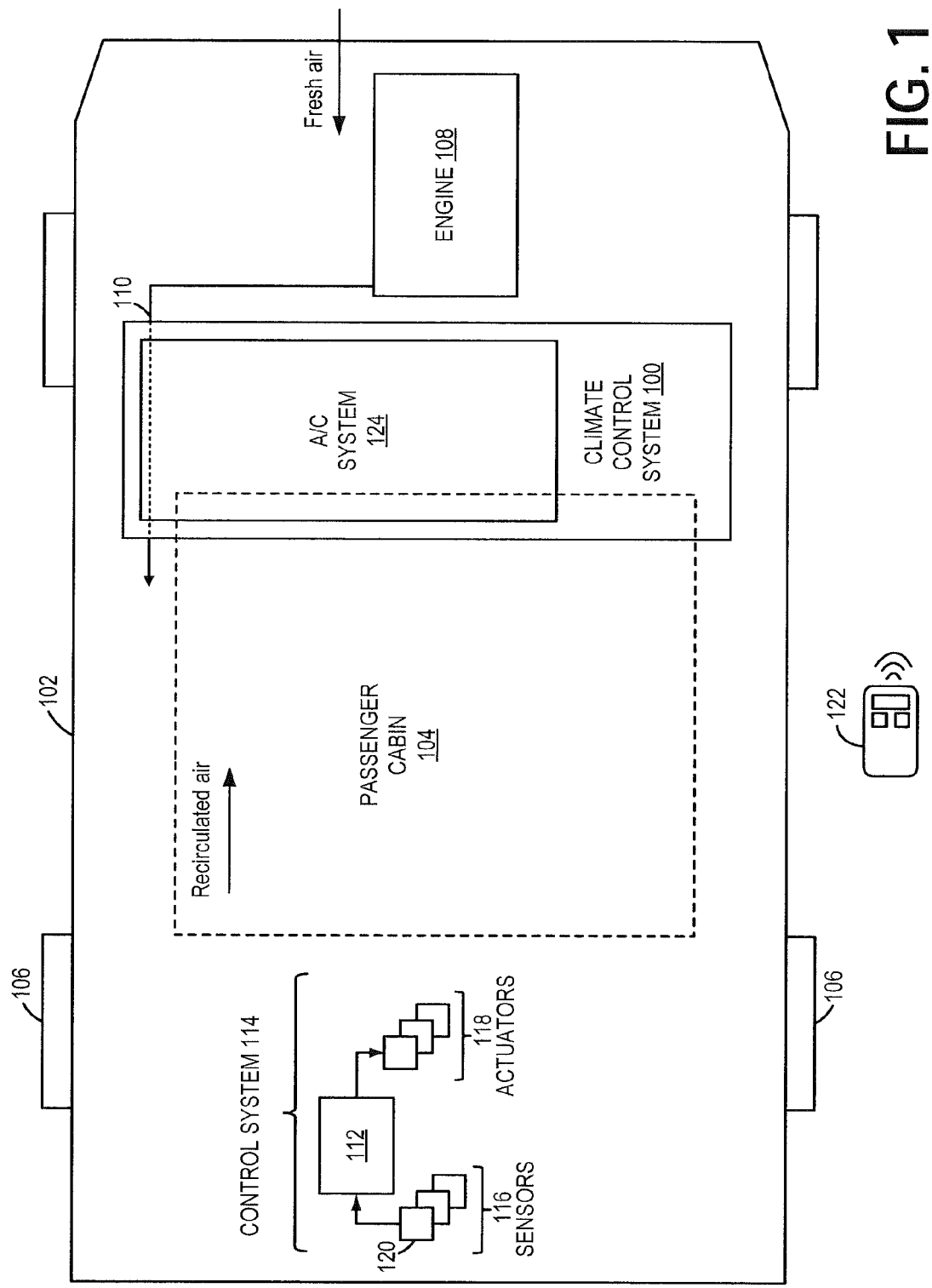
FIG. 1 schematically shows a motor vehicle incorporating the air-conditioning system described herein.
Figure 2A:
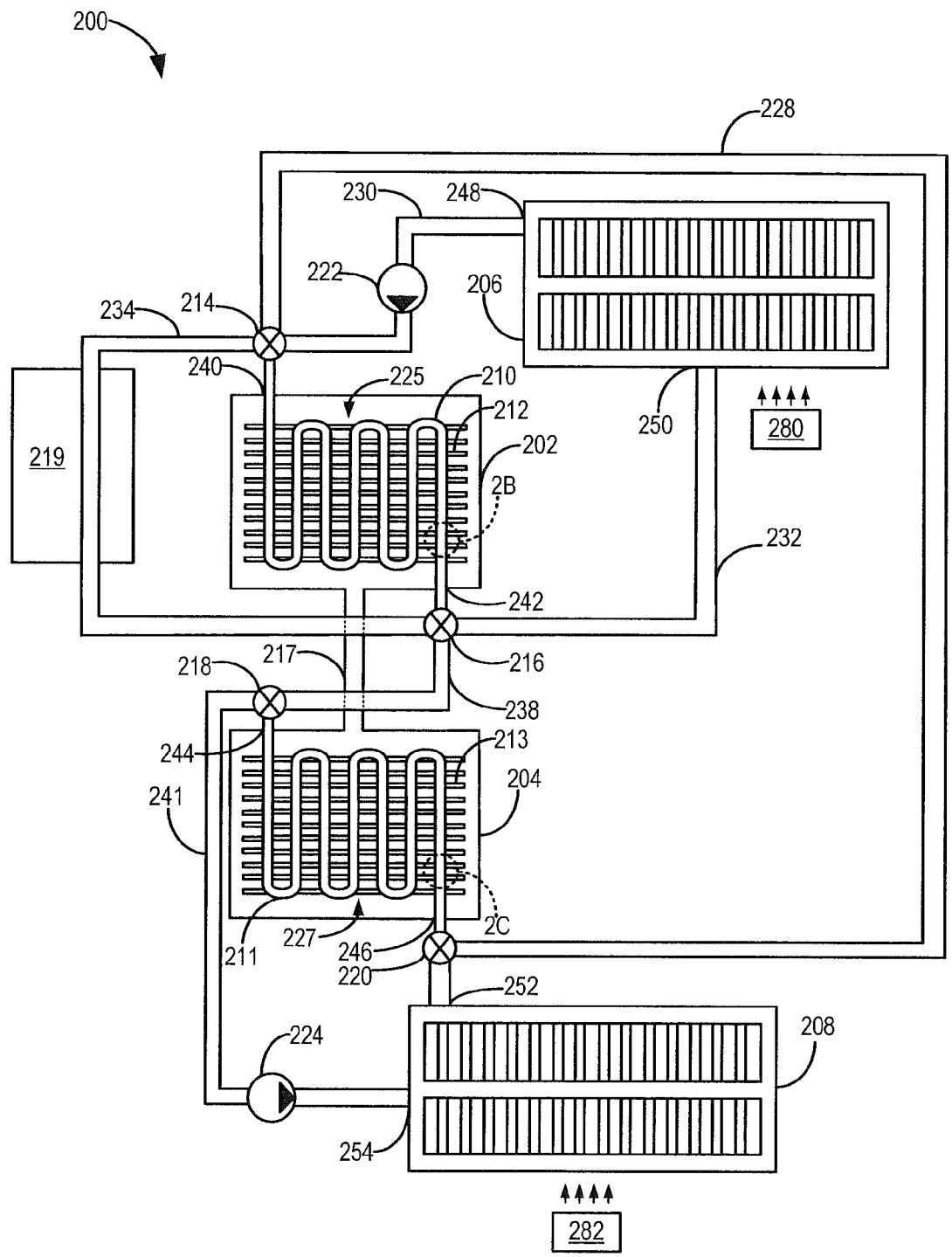
FIG. 2A schematically shows an example air-conditioning system which may be included in the motor vehicle of FIG. 1, including a heat exchanger pair, a radiator, and an air-conditioning core.
Figure 2B:
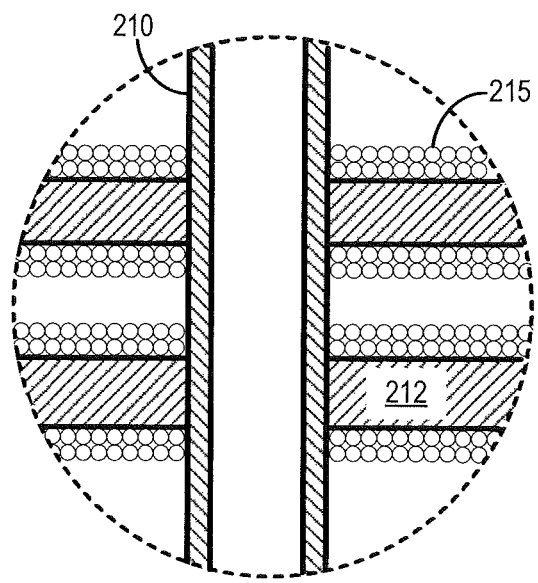
FIG. 2B shows a detailed partial cross-sectional view of a tube and plates of the tube-and-plate assembly of the first heat exchanger of the heat exchanger pair of FIG. 2A.
Figure 2C:
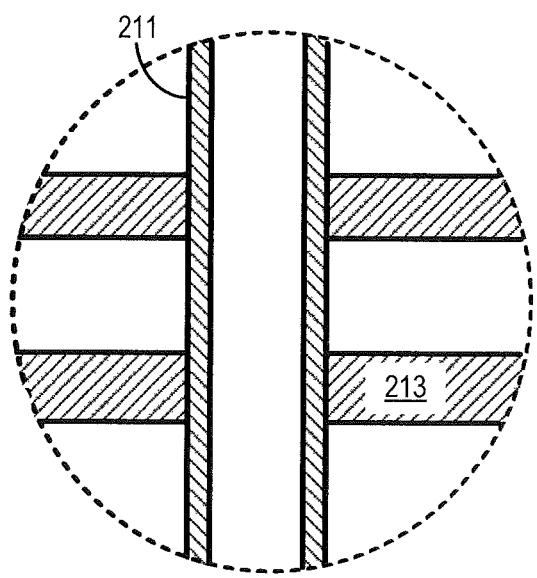
FIG. 2C shows a detailed partial cross-sectional view of a tube and plates of the tube-and-plate assembly of the second heat exchanger of the heat exchanger pair of FIG. 2A.
Figure 3A:
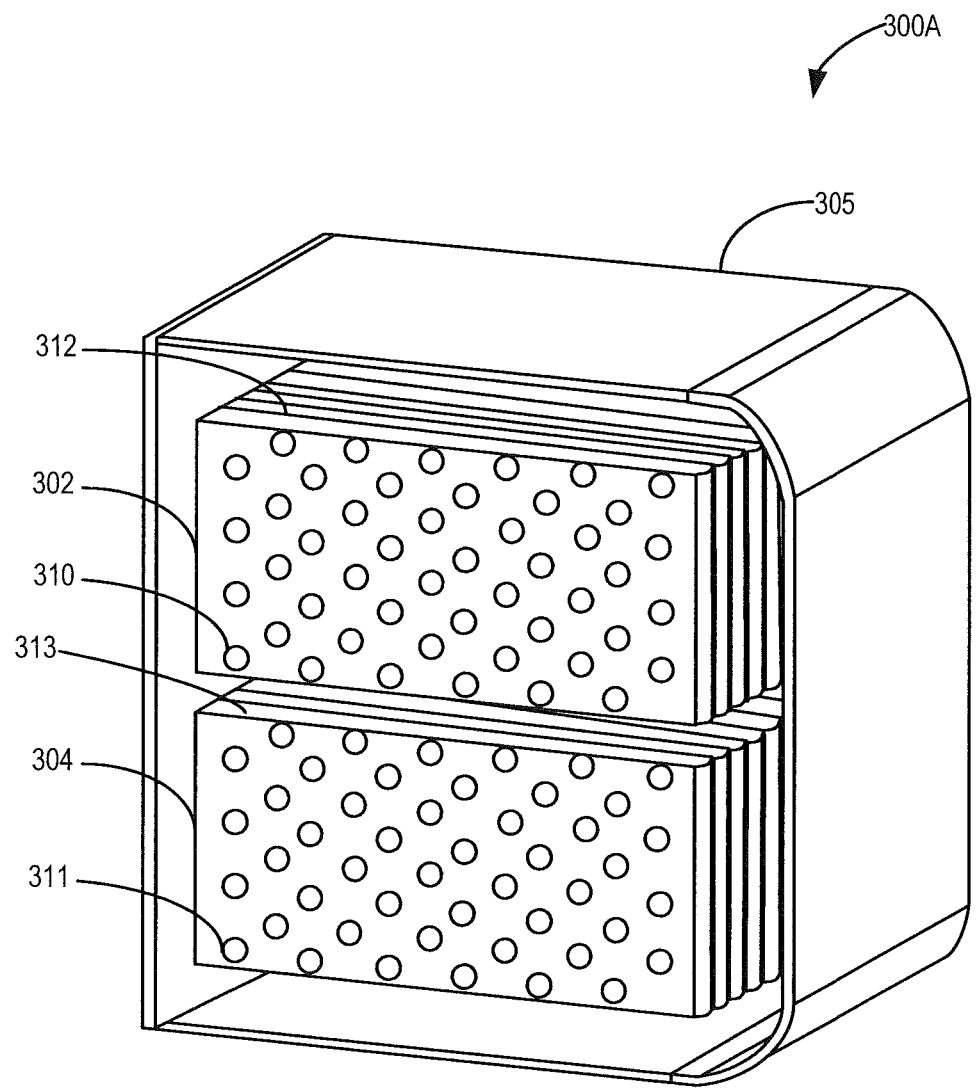
FIG. 3A schematically shows one embodiment of a heat exchanger pair arranged in an enclosure which may be included in the air-conditioning system of FIG. 2A.
Figure 3B:
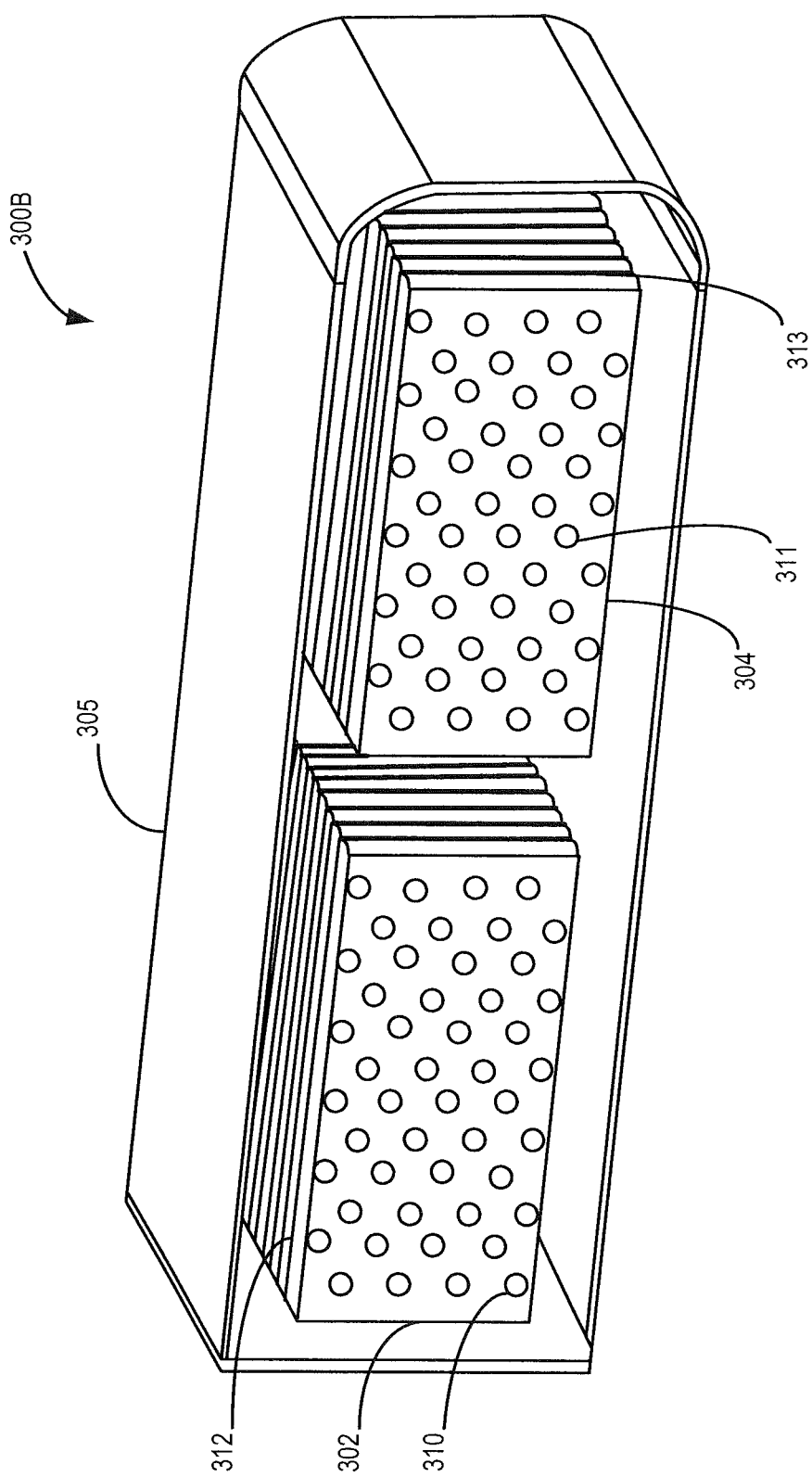
FIG. 3B schematically shows another embodiment of a heat exchanger pair arranged in an enclosure which may be included in the air-conditioning system of FIG. 2A.
Figure 4:
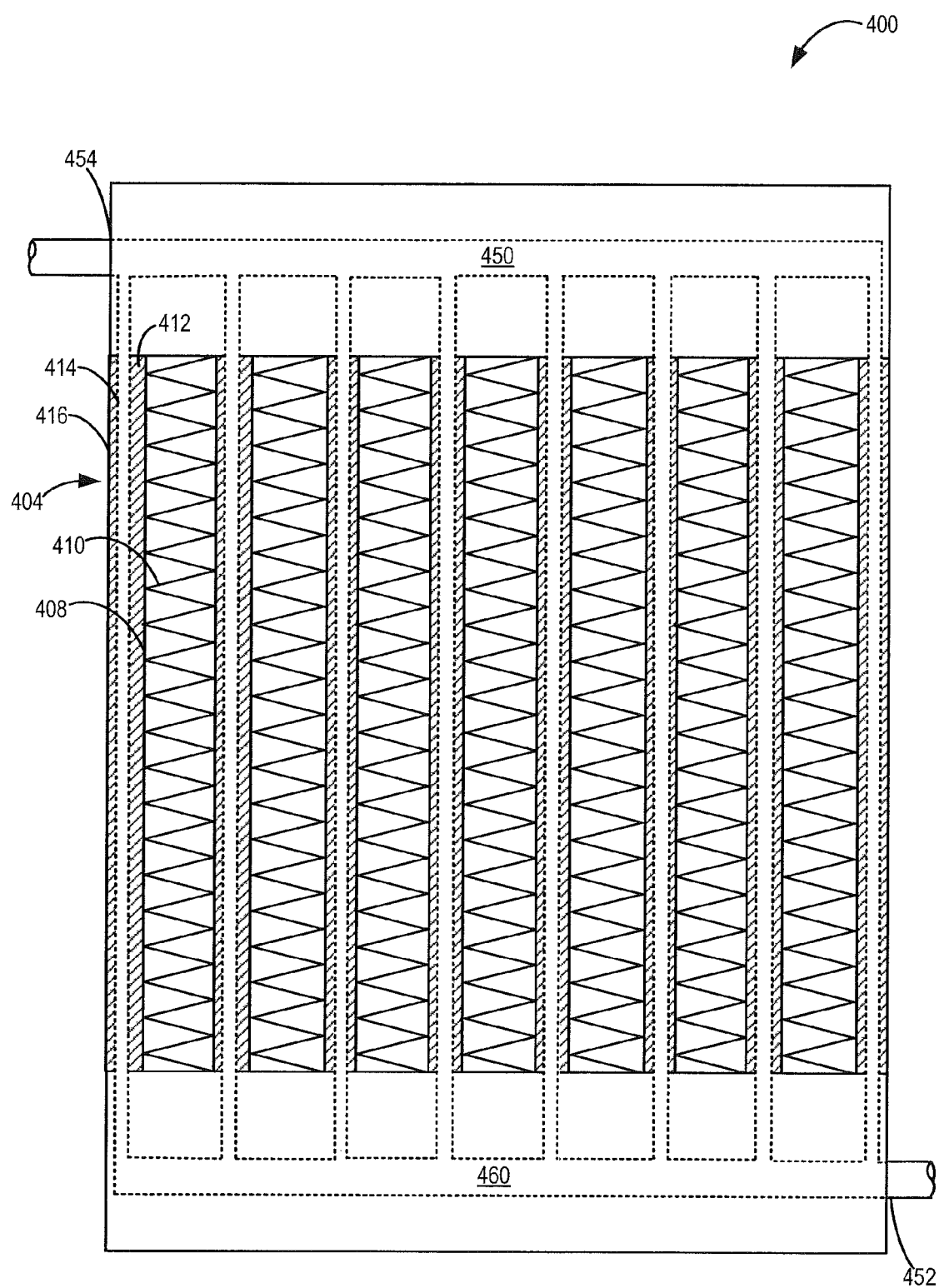
FIG. 4 schematically shows one embodiment of an air-conditioning core which may be included in the air-conditioning system of FIG. 2A.

As shown at FIG. 1, when incorporated in an engine-driven vehicle, the air-conditioning system may be thermally coupled with an engine waste heat recovery system, but may not otherwise communicate with or load the vehicle's engine. The air-conditioning system may include two heat exchangers arranged in a vacuum enclosure as shown at FIGS. 3A-3B, a radiator, and an air-conditioning core. As shown at FIGS. 2A-2C, the two heat exchangers may include a first heat exchanger and a second heat exchanger. The first heat exchanger may include a tube-and-plate assembly including tubes thermally coupled with plates, the plates coated with adsorbent materials, and may communicate with a heat source or a radiator, depending on whether it is in an adsorbing mode or a desorbing mode, whereas the second heat exchanger may include a tube-and-plate assembly including tubes thermally coupled with plates, the plates not having an adsorbent coating and no adsorbent materials included in the second heat exchanger. The second heat exchanger may communicate with the radiator or an air-conditioning core, depending on whether the first heat exchanger is adsorbing or desorbing. As shown in FIG. 4, the air-conditioning core may include phase changing materials (PCM); ambient or recirculated air blown through the air-conditioning core may be cooled via heat exchange with melting PCM during the desorbing mode.

Figure 5A:
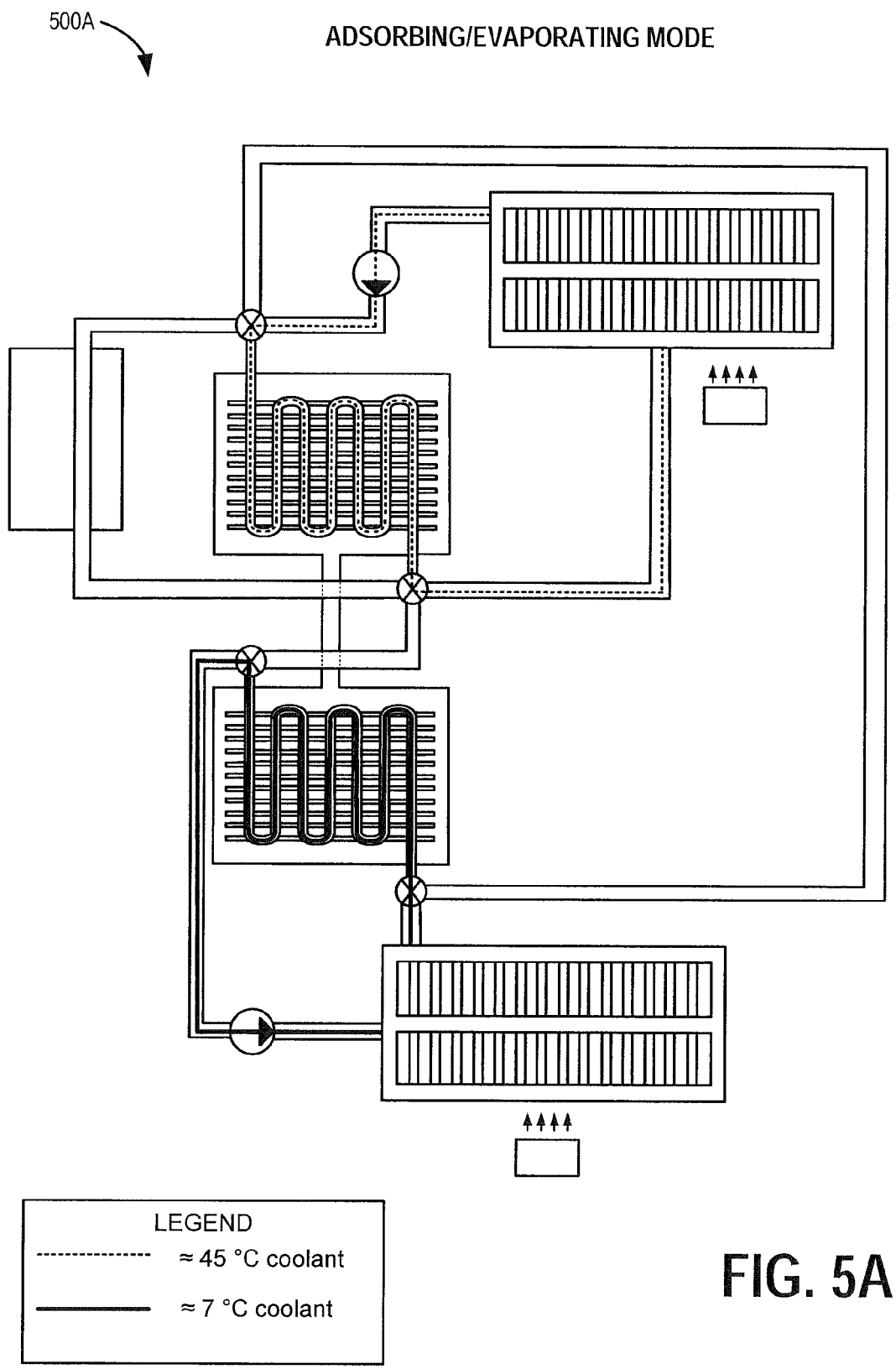
FIG. 5A schematically shows the air-conditioning system of FIG. 2A in an adsorbing/evaporating mode.
Figure 5B:
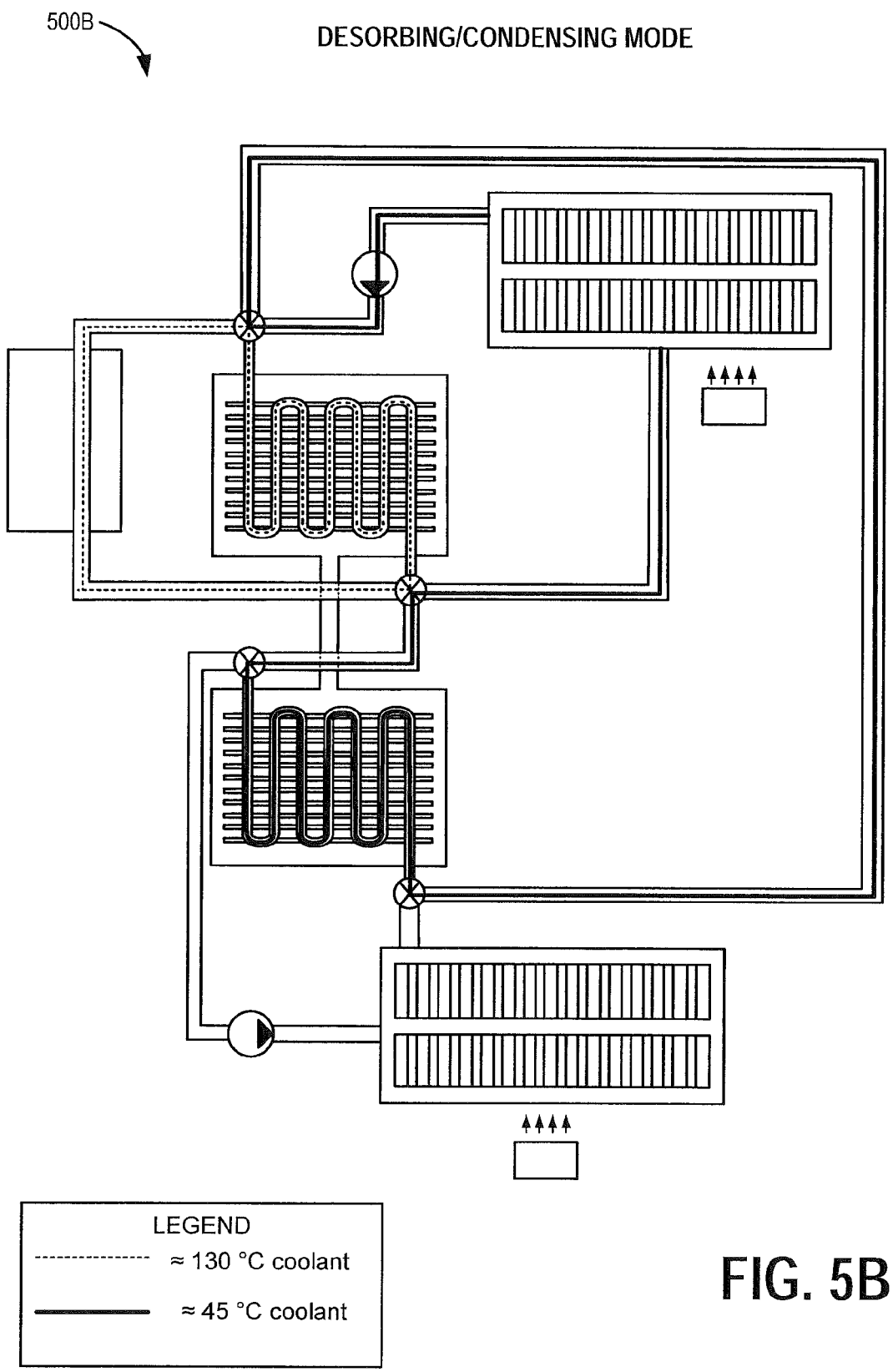
FIG. 5B schematically shows the air-conditioning system of FIG. 2A in a desorbing/condensing mode.
Figure 6:
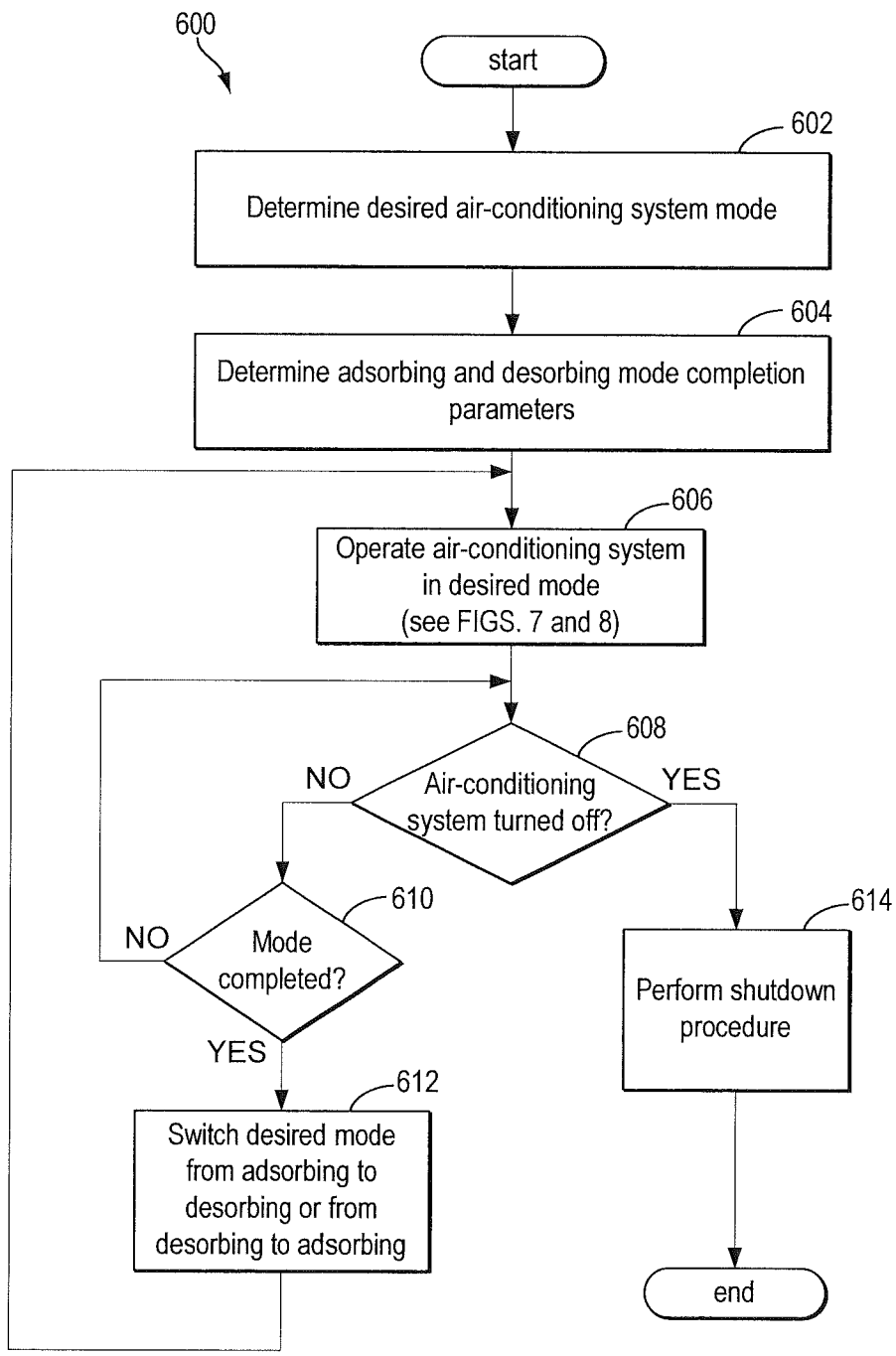
FIG. 6 depicts an example method for operating the air-conditioning system of FIG. 2A.
Figure 7:
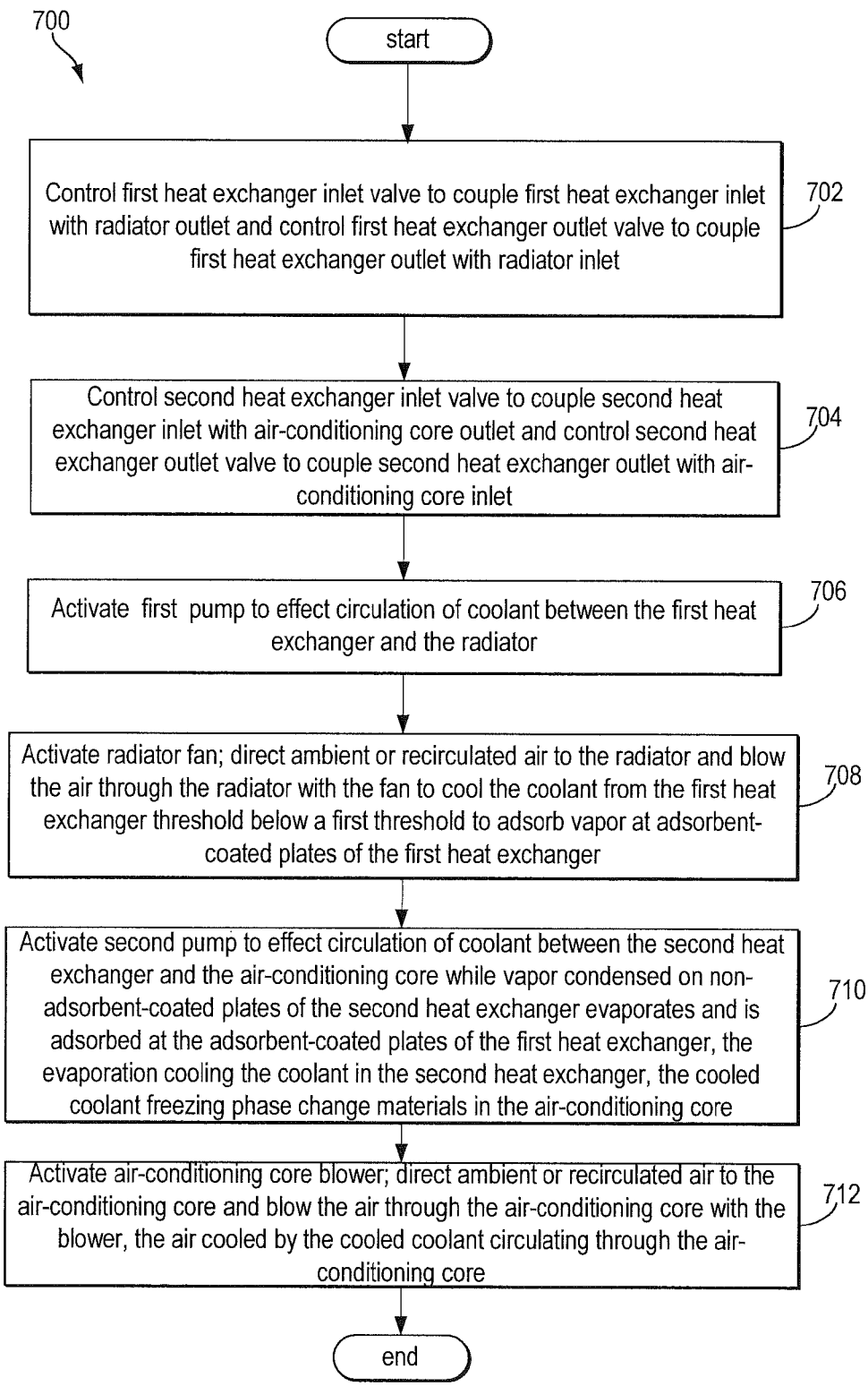
FIG. 7 depicts an example method for operating the air-conditioning system of FIG. 2A in the adsorbing/evaporating mode.
Figure 8:
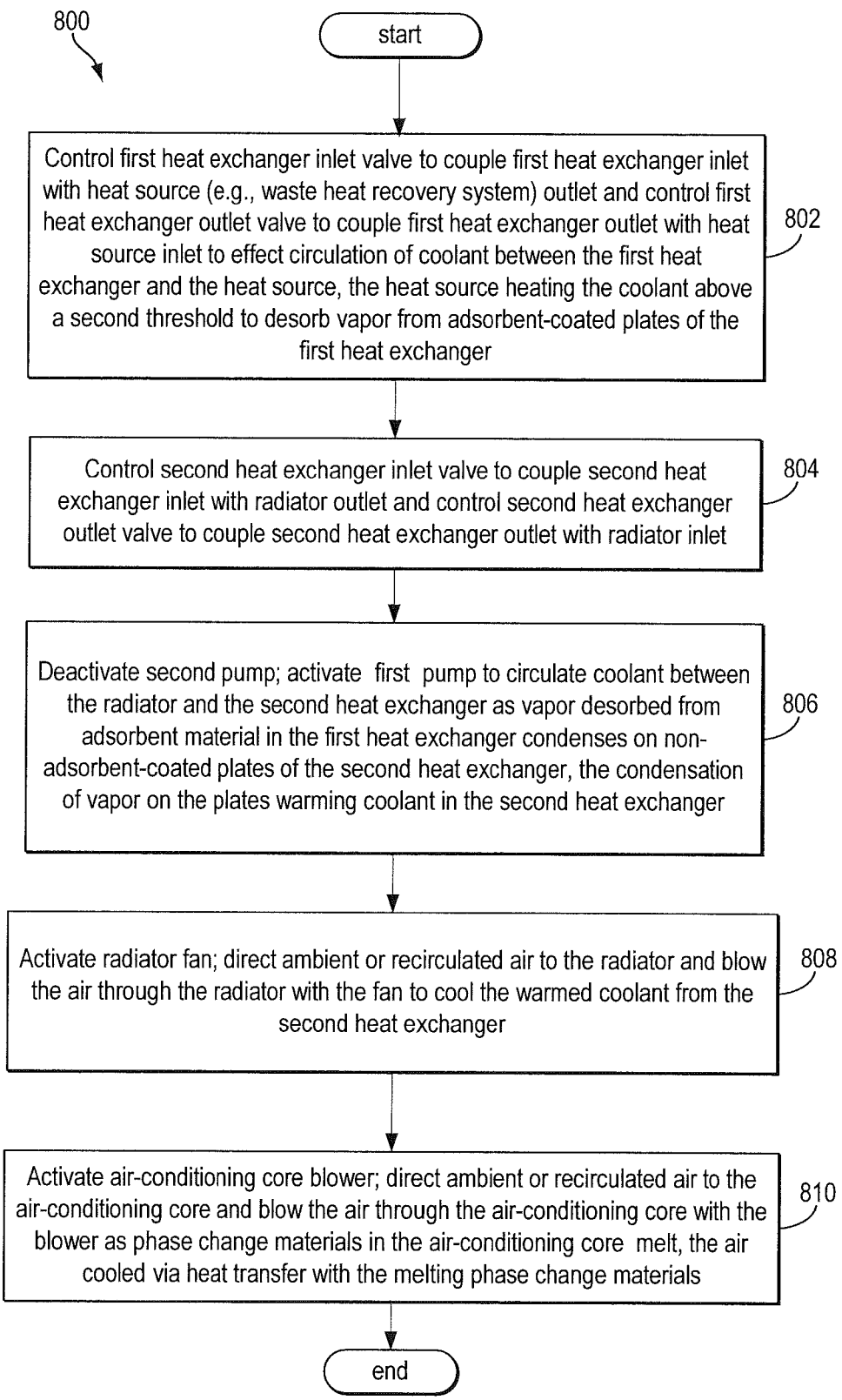
FIG. 8 depicts an example method for operating the air-conditioning system of FIG. 2A in the desorbing/condensing mode.

The air-conditioning system may switch between an adsorbing/evaporating mode, where adsorption occurs at the first heat exchanger, evaporation occurs at the second heat exchanger, and PCM in the air-conditioning core freezes, and a desorbing/condensing mode, where desorption occurs at the first heat exchanger, condensation occurs at the second heat exchanger, and PCM in the air-conditioning core melts. Operation in the adsorbing mode is shown at FIG. 5A and operation in the desorbing mode is shown at FIG. 5B. An example method for operation of the air-conditioning system of FIG. 1 is shown at FIG. 6. An example method for operation of the air-conditioning system of FIG. 1 in adsorbing mode is shown at FIG. 7, and an example method for operation of the air-conditioning system of FIG. 1 in desorbing mode is shown at FIG. 8.

Turning now to FIG. 1, an example embodiment of a vehicle climate control system 100 in a motor vehicle 102 is illustrated schematically. Vehicle 102 includes drive wheels 106, a passenger cabin 104, and an internal combustion engine 108. Internal combustion engine 108 includes a combustion chamber (not shown) which may receive intake air via an intake passage (not shown) and may exhaust combustion gases via exhaust passage 110. Motor vehicle 102 may be a road automobile, among other types of vehicles.

Unlike some vehicle climate control systems which may circulate coolant through the engine to absorb waste engine heat and distribute the heated coolant to a radiator and/or heater core via coolant lines, climate control system 100 may not fluidly communicate with engine 108. Further, climate control system 100 may include a thermal-adsorption air-conditioning (A/C) system 124 (described in further detail below) which is driven by thermal energy from engine exhaust rather than by an engine crankshaft or electrical motor. Accordingly, the only coordination between engine 108 and climate control system 100 may be the routing of the engine exhaust in exhaust passage 110 through an exhaust heat recovery system 111 of climate control system 100, as will be detailed below. In this way, engine 108 may be largely freed from providing climate control in the vehicle, and climate control system 100 may not exert a load on engine 108. Further, as engine coolant may not circulate through climate control system 100, the volume of coolant in the engine may be reduced. Some advantages of a reduced volume of engine coolant include quicker engine warm-up and thus reduced cold start emissions, for example.

FIG. 1 further shows a control system 114 of vehicle 102. Control system 114 may be communicatively coupled to various components of engine 108 and climate control system 100 to carry out the control routines and actions described herein. As shown in FIG. 1, control system 114 may include an electronic digital controller 112. Controller 112 may be a microcomputer, including a microprocessor unit, input/output ports, an electronic storage medium for executable programs and calibration values, random access memory, keep alive memory, and a data bus.

As depicted, controller 112 may receive input from a plurality of sensors 116, which may include user inputs and/or sensors (such as transmission gear position, transmission clutch position, gas pedal input, brake input, transmission selector position, vehicle speed, engine speed, mass airflow through the engine, ambient temperature, intake air temperature, etc.), climate control system sensors (such as coolant temperature, adsorbent temperature, fan speed, passenger compartment temperature, desired passenger compartment temperature, ambient humidity, etc.), and others. As shown in FIG. 1, sensors 116 may include a fob sensor 120 configured to receive input from an electronic fob 122. Specifically, fob sensor 120 may remotely couple vehicle 102 to electronic fob 122, thereby enabling remote control of certain functions of vehicle 102. In one example, electronic fob 122 may remotely activate climate control system 100 so as to pre-condition cabin air. Depending on ambient conditions, for example as sensed by one or more of sensors 116, and/or user input, electronic fob 122 may remotely activate climate control system 100 to pre-condition cabin air prior to engine start. Thus, a future vehicle operator or passenger may use electronic fob 122 to ensure that a desired cabin temperature will be present when they enter the vehicle.

In addition to enabling remote activation of climate control system 100, electronic fob 122 may enable a remote keyless entry into vehicle 102. In this case, fob sensor 120 may be further configured to provide an indication to controller 112 regarding the locked or unlocked position of vehicle doors.

Further, controller 112 may communicate with various actuators 118, which may include engine actuators (such as fuel injectors, an electronically controlled intake air throttle plate, spark plugs, transmission clutches, etc.), climate control system actuators (such as air handling vents and/or diverter valves, valves controlling the flow of coolant, blower actuators, fan actuators, etc.), and others. In some examples, the storage medium may be programmed with computer readable data representing instructions executable by the processor for performing the methods described below as well as other variants that are anticipated but not specifically listed.

As described above, climate control system 100 includes a thermal-adsorption A/C system 124. A/C system 124 may be driven by thermal energy rather than by a mechanical compressor. A/C system 124 may include a pair of heat exchangers, which may be arranged in fluid communication with one another within a vacuum enclosure. The heat exchanger pair may operate in conjunction with a radiator and an air-conditioning (A/C) core, the A/C core containing phase changing materials. At a given time, a first heat exchanger of the heat exchanger pair may operate as an adsorber/desorber while a second heat exchanger of the heat exchanger pair may operate as an evaporator/condenser. Operation of A/C system 124 may periodically switch between an adsorbing mode and a desorbing mode. Structural and functional details of the A/C system will be further described with respect to FIGS. 2-8.

FIG. 2A is a schematic depiction of an example A/C system 200. As shown, A/C system 200 includes a heat exchanger pair comprising a first heat exchanger 202 and a second heat exchanger 204; example embodiments of the heat exchanger pair are described herein with respect to FIGS. 3A-3B. A/C system 200 further includes a radiator 206, an A/C core 208, and a heat source 219. A/C core 208 is described in further detail herein with respect to FIG. 4. Heat source 219 may be an exhaust waste heat recovery system, in examples where A/C system 200 is incorporated in an engine-driven vehicle. Alternatively, if A/C system 200 is a standalone A/C system (e.g., an A/C system not incorporated in a vehicle), another suitable heat source may be used as heat source 219. A/C system 200 may be one example embodiment of A/C system 124 of FIG. 1.

While the schematic depiction of the heat exchanger pair in FIG. 2 shows a conduit 217 which provides fluid communication between enclosures housing the first and second heat exchangers, respectively, in other examples, the heat exchangers may be housed in a common enclosure, e.g. a vacuum enclosure. The common enclosure may be filled with heat transfer fluid such as water which may be adsorbed/desorbed at plates of the tube-and-plate assembly of the first heat exchanger and evaporated from/condensed on plates of the tube-and-plate assembly of the second heat exchanger, depending on operating conditions. Examples of heat exchanger pair structure will be described with respect to FIGS. 3A and 3B. While the heat transfer fluid (e.g., water, ammonia, R1234f, or another suitable refrigerant) contained in the heat exchangers will be referred to herein as "vapor" for the sake of convenience, it will be appreciated that this heat transfer fluid is not limited to fluid in a vaporized state, and may be in another state depending on operating conditions (e.g., condensed/liquified).

In addition to the vapor contained within the enclosure(s) housing heat exchangers 202 and 204, another heat transfer fluid may flow through one or more tubes of the tube-and-plate assembly of each heat exchanger. This other heat transfer fluid, which will be referred to herein as "coolant" to differentiate it from the vapor contained within the heat exchanger enclosure(s), may be glycol, a glycol and water mixture, or another suitable coolant, for example. The vapor inside the heat exchanger enclosure(s) and the coolant flowing through the tubes may be thermally coupled with each other, but not fluidly coupled with each other. The thermal coupling of the vapor and coolant will be described in further detail herein with regard to FIGS. 5A and 5B.

First heat exchanger 202 may include a tube and plate assembly 225 including one or more tubes 210 and a plurality of plates 212 thermally coupled with the tube. Plates 212 may be metal plates, or plates made of another thermally conductive material. While plural tubes 210 will be referred to herein for the sake of simplicity, it will be appreciated that the first heat exchanger may include a snaking arrangement of a single tube 210 as shown in FIG. 2A rather than multiple separate tubes. Coolant may flow in the tubes of the tube-and-plate assembly; e.g., when coolant circulates between the first heat exchanger and the radiator or the heat source, as will be detailed below, it may circulate in the tubes of the tube-and-plate assembly of the first heat exchanger. The tubes and the plates may be made of different types of metals or the same type of metal, or the tubes and/or plates may be made of a different (non-metal) thermally conductive material, without departing from the scope of this disclosure. As shown in detail in FIG. 2B, plates 212 of the first heat exchanger may be coated with an adsorbent 215, and the adsorbent coated on the plates may be thermally coupled with coolant flowing in the tubes. For example, adsorbent 215 may be sprayed onto the plates along with a binder. Adsorbent 215 may be a chemical adsorbent such as zeolite, silica gel, or activated carbon. Alternatively, another suitable adsorption heat exchanger may be used in the climate control system described herein. For example, rather than a coating, adsorbent 215 could be metal foam, or another suitable type of highly porous metal-organic framework (MOF).

Like first heat exchanger 202, second heat exchanger 204 may include a tube-and-plate assembly 227 including one or more tubes 211 through which the coolant may flow and a plurality of plates 213 thermally coupled with the tube. Plates 213 may be metal plates, or plates made of another thermally conductive material. While plural tubes 211 will be referred to herein for the sake of simplicity, it will be appreciated that the first heat exchanger may include a snaking arrangement of a single tube 211 as shown in FIG. 2A, rather than multiple separate tubes. The tubes and the plates may be made of different types of metals or the same type of metal, or the tubes and/or plates may be made of a different (non-metal) thermally conductive material, without departing from the scope of this disclosure. However, unlike in the first heat exchanger, plates 213 may not be coated with an adsorbent, and the second heat exchanger may not include any adsorbent material, as may be seen in the detail view of FIG. 2C. Instead, depending on an operating mode of the heat exchanger pair, vapor desorbed from the adsorbent of the first heat exchanger may condense on plates 213 or evaporate from plates 213.

As will be described herein with respect to FIGS. 5A and 5B, first heat exchanger 202 may function as either an adsorber or a desorber, as a result of heat exchange between the coolant flowing in the tubes and the adsorbent. Depending on whether the heat exchanger is currently in an adsorbing or desorbing mode, a first heat exchanger inlet valve 214 and a first heat exchanger outlet valve 216 may be controlled circulate coolant between either heat source 219 or radiator 206 and tubes 210 of heat exchanger 202. Conduit 230 may couple an outlet 248 of the radiator to an inlet port 240 of the first heat exchanger; a pump 222 may be included in conduit 230 to pump coolant from radiator 206 to either first heat exchanger 202 or second heat exchanger 204, depending on the positions of first heat exchanger inlet valve 214 and second heat exchanger inlet valve 220. Further, a conduit 234 may thermally couple heat source 219 with inlet port 240 and outlet port 242 of the first heat exchanger, depending on the positions of first heat exchanger inlet valve 214 and first heat exchanger outlet valve 216.

Further, second heat exchanger 204 may operate as an evaporator/condenser. As noted above, although first and second heat exchangers 202 and 204 may be structurally similar with a similar arrangement of tubes, the plates of the second heat exchanger 204 may not be coated with adsorbent. Instead, a thin layer of a liquid vapor (a layer with a depth of 0.2 millimeters, for example) may be present during a desorbing/condensing mode of the heat exchanger pair, as a result of condensation on the plates of vapor desorbed from the adsorbent of the first heat exchanger.

Depending on whether the second heat exchanger is currently in an evaporation or condensation mode, a second heat exchanger outlet valve 218 and a second heat exchanger inlet valve 220 may be controlled to circulate coolant between tubes 211 of second heat exchanger 204 and either A/C core 208 or radiator 206. An outlet port 244 of the second heat exchanger may either be coupled to an inlet 254 of the A/C core via a conduit 241, or to an inlet 250 of radiator 206 via conduits 238 and 232. Conduit 241 may include a pump 224 which may induce circulation of coolant between A/C core 208 and second heat exchanger 204.

In the depicted example, conduit 238 may fluidly communicate the outlet port 244 of the second heat exchanger with first heat exchanger outlet valve 216, and conduit 232 may fluidly communicate first heat exchanger outlet valve 216 with inlet 250 of radiator 206, depending on the positions of first heat exchanger outlet valve 216 and second heat exchanger outlet valve 218. Accordingly, depending on the position of first heat exchanger outlet valve 216, conduit 232 may couple an outlet port 242 of the first heat exchanger with inlet 250 of the radiator. Further, as shown, a conduit 228 may couple inlet port 246 of the second heat exchanger with either outlet 252 of the A/C core or outlet 248 of the radiator (via first heat exchanger inlet valve 214).

As shown, a blower 282 may be included in the A/C system to push ambient air, recirculated vehicle cabin air, or air from another source through A/C core 208 to be cooled. Further, a fan 280 may be included in the A/C system to push ambient air, recirculated vehicle cabin air, or air from another source through radiator 206 to exchange heat with coolant flowing through the radiator, thereby cooling the coolant.

Turning to FIG. 3A, it shows a perspective, cross-sectional view of a heat exchanger pair 300A comprising first and second heat exchangers 302 and 304 which may be included in A/C system 200 of FIG. 2A. Many of the elements of FIG. 3A correspond to similarly numbered elements already described above for FIG. 2A; such elements will not be described again for the sake of brevity.

First heat exchanger 302 and second heat exchanger 304 of heat exchanger pair 300 may be arranged vertically (that is, with one heat exchanger positioned above the other) within enclosure 305. Enclosure 305 may be a vacuum enclosure. While the first heat exchanger is positioned vertically above the second heat exchanger in the depicted example, the second heat exchanger may alternatively be positioned vertically above the first heat exchanger without departing from the scope of this disclosure.

As for FIG. 3B, it shows a perspective, cross-sectional view of another exemplary heat exchanger pair 300B comprising first and second heat exchangers 302 and 304 which may be included in A/C system 200 of FIG. 2A. Like FIG. 3A, many of the elements of FIG. 3B correspond to similarly numbered elements already described above for FIG. 2A; such elements will not be described again for the sake of brevity.

First heat exchanger 302 and second heat exchanger 304 of heat exchanger pair 300 may be arranged horizontally (for example, with a side of one heat exchanger flanking a side of the other heat exchanger such that the heat exchangers are side-by-side) within enclosure 305. In examples where the A/C system is incorporated in a motor vehicle, it may be advantageous to arrange the heat exchangers side-by-side, as the resulting geometry of the heat exchanger pair may be well-suited for arrangement in a vehicle underbody.

Now referring to the embodiments of both of FIGS. 3A and 3B, as shown the first and second heat exchangers may be mounted within the enclosure with space remaining between the sides, top, and bottom of the enclosure and the heat exchangers, such that vapor may flow freely in and around the heat exchangers (e.g., such that it can be adsorbed at the adsorbent coating of the first heat exchanger and condensed on the plates of the second heat exchanger). In other examples, however, there may be a partition separating the enclosure into two sections, each section housing one of the heat exchangers, and vapor may travel between the sections depending on a position of a valve such as a butterfly valve.

While not shown in the perspective cross-sectional views of the example heat exchanger pairs, it will be appreciated that the heat exchanger pair may include an inlet and outlet port for each of the heat exchangers (e.g., corresponding to inlet ports 240 and 246 and outlet ports 242 and 244 of FIG. 2A). Coolant may enter and exit the tubes of the tube-and-plate assembly of each heat exchanger by way of the corresponding inlet and outlet. Whereas the tubes of the heat exchangers may be fluidly coupled with other components of the A/C system depending on the positions of the various valves (e.g., the radiator and the A/C core), the vapor within the enclosure may remain within the enclosure and may not be circulated to other components of the A/C system. Put another way, the vapor within the enclosure remains in a closed loop between the two heat exchangers within the enclosure and is fluidly isolated from other heat transfer fluids. However, as noted above, the vapor is thermally coupled with coolant traveling in the tubes of the two heat exchangers.

Depending on how many tubes are included in each heat exchanger, the tubes of a given heat exchanger may be coupled to each other at both ends such that the tubes form a snaking pattern. In one example, the tubes may be coupled vertically. For example, a tube may be coupled to a tube positioned above and/or to a tube positioned below. In another example, the tubes may be connected horizontally. For example, a tube may be coupled to tubes positioned at a right side and/or a left side. In still another example, the tubes may be coupled diagonally. The plates may be stacked with space in between such that vapor may flow freely in between the plates and around the tubes within the enclosure.

FIG. 4 schematically shows an A/C core 400. A/C core 400 may be one non-limiting example of A/C core 208 of FIG. 2A, for example. It will be appreciated that other A/C core designs may be used without departing from the scope of this disclosure. A/C core 400 may be structurally similar to an automotive heater core in some ways. However, unlike an automotive heater core, A/C core 400 operates using coolant in a single phase, rather than coolant in two phases. Whereas an automotive heater core may include two-phase refrigerant in flat tubes, A/C core 400 a single-phase coolant which is very cold (e.g., approximately 5° C.) and which does not change phase either circulates through tubes of A/C core 400, or remains stagnant in tubes of A/C core 400, depending on the operating mode of the A/C system. Further, unlike an automotive heater core, A/C core 400 contains PCM in thermal communication with the single phase coolant.

As shown, A/C core 400 includes multiple segments 408, with each segment 408 containing air-cooling fins 410. Segments 408 are each separated from one another by double tube plates 404. Each plate 404 comprises an inner tube 414 surrounded by PCM compartments 412 within an outer tube 416. Inner tube 414 and outer tube 416 may be flat tubes, for example. Inner tube 414 may fluidly communicate with the heat exchanger pair of the A/C system, such that coolant circulates between the second heat exchanger and the plates of the A/C core during operating conditions where the second heat exchanger and the A/C core fluidly communicate (e.g., during the adsorbing mode which will be described in detail with respect to FIG. 5A). For example, inlet 454 of A/C core 400 may correspond to inlet 254 of A/C core 208 of FIG. 2A, outlet 452 of A/C core 400 may correspond to outlet 252 of A/C core 208 of FIG. 2A. As shown, after entering inlet 454, coolant may flow in a conduit 450 which is fluidly coupled to a top end of each of inner tubes 414 of plates 404. After passing through inner tubes 414, coolant may enter a conduit 460 which leads to outlet 452 of the A/C core and which is coupled to a bottom end of each of inner tubes 414. As shown, conduits 450 and 460 may be fluidly coupled with each of the plates 404, such that coolant may circulate among the second heat exchanger of the A/C system and the plates of the A/C core. It will be appreciated that the depicted structure of the coolant conduits 450 and 460 and the related features is non-limiting, and other possible structure may be used to direct coolant through the A/C core without departing from the scope of this disclosure.

In the depicted example, a PCM compartment 412 surrounds the inner tube 414 of each plate 404, and is surrounded by the outer tube 416 of the plate. In examples where inner tubes 414 and outer tubes 416 are flat tubes, each PCM compartment may have a rectangular cuboid shape with a hollow rectangular cuboid portion in which the inner tube 414 is arranged. However, the inner tubes, outer tubes, and PCM compartments may have other shapes or may be arranged otherwise in A/C core 400 without departing from the scope of this disclosure.

During operation of the A/C system, a blower may push outside air or recirculated cabin air past the A/C core, e.g. to cool a vehicle cabin. During the adsorbing mode of the A/C system, coolant cooled due to the evaporation of vapor from plates of the tube-and-plate assembly of the second heat exchanger circulates between the second heat exchanger and the A/C core, specifically circulating in conduits 450 and 460 and inner tubes 414 of the A/C core. The cooled coolant may have a temperature in the range of 5-8° C., in one non-limiting example. Accordingly, during this mode, the cooled coolant in the inner tubes of the plates cools the air being pushed through the A/C core by the blower, while at the same time, the cooled coolant freezes the PCM in the PCM compartments of the A/C core which are thermally coupled with the inner tubes inside the plates.

In contrast, during the desorbing mode of the A/C system, the second heat exchanger does not fluidly communicate with the A/C core, and the coolant already inside the inner tubes 414 remains stagnant and the PCM in the PCM compartments is no longer actively cooled. As a result, the PCM begins melting during this mode; a melting point of PCM within the PCM compartments 412 may be in the range of 5-7° C., in one non-limiting example. Meanwhile, as the blower (e.g., blower 282 of FIG. 2A) pushes warm air (e.g. outside air or recirculated cabin air) through the segments of the A/C core, the warm air exchanges heat with PCM in the PCM compartments and is thereby cooled. Accordingly, even during the desorbing mode when cooled coolant is not provided to the A/C core by the heat exchanger pair, the A/C core may still provide cooling to air which is pushed through the A/C core via heat exchange with melting PCM.

Thus, as shown in FIGS. 1-4, an air-conditioning system may comprise first and second tube-and-plate heat exchangers thermally coupled by vapor inside a vacuum enclosure, a first coolant loop comprising adsorbent-coated plates of the first heat exchanger and either a heat source or a radiator depending on an operating mode of the air-conditioning system, and a second coolant loop comprising non-adsorbent-coated plates of the second heat exchanger and either the radiator or a core containing phase changing materials, depending on the mode. As will be detailed below with respect to FIGS. 5A and 5B, during a desorbing/condensing mode, the first coolant loop may comprise the heat source and the second coolant loop may comprise the radiator, whereas during an adsorbing/evaporating mode, the first coolant loop may comprise the radiator and the second coolant loop may comprise the core.

FIGS. 5A and 5B depict coolant flow in A/C systems which correspond to A/C system 200 of FIG. 2A during adsorbing/evaporating and desorbing/condensing operating modes, respectively. As the depicted systems 500A and 500B correspond to system 200A of FIG. 2, the above description of system 200A also applies to systems 500A and 500B.

During adsorbing/evaporating mode, as shown in FIG. 5A, the controller may control first heat exchanger inlet valve 214 and first heat exchanger outlet valve 216 to couple the first heat exchanger and the radiator, and may control the pump 222 to induce coolant circulation between the radiator and the first heat exchanger, in the direction indicated by the arrow on pump 222. The coolant may flow through the snaking tubes of the first heat exchanger. As indicated, the coolant circulating between the radiator and the first heat exchanger may be at a temperature of approximately 45° C.

Coolant flow at this temperature may induce adsorption of vapor at the adsorbent coating of the plates of the first heat exchanger. The heat of adsorption of vapor in the first heat exchanger may then be transferred to the coolant flowing through the tubes of the first heat exchanger; consequently, coolant in the first heat exchanger may be warmed, e.g. to approximately 50° C. The warmed coolant may be circulated back to the radiator where the coolant may be cooled by rejecting heat to the environment, as the fan pushes air through the radiator. For example, radiator may cool the coolant back down to approximately 45° C. As indicated in the legend, coolant circulating between the first heat exchanger and the radiator in the adsorbing/desorbing mode is indicated by a dashed line in FIG. 5A.

Further, during the adsorbing mode, coolant also circulates in a separate circuit (e.g., a circuit isolated from the coolant which is circulating between the first heat exchanger and the radiator) between the second heat exchanger and the A/C core. For example, the controller may control the second heat exchanger outlet valve 218 and the second heat exchanger inlet valve 220 to couple the second heat exchanger to the A/C core during this mode, and pump 224 may be operated to induce flow of coolant between the second heat exchanger and the A/C core, in the direction indicated by the arrow on pump 224. Adsorption of vapor at the first heat exchanger may lower the absolute pressure inside the enclosure housing the heat exchangers to within a range of approximately 0.5 to 1.0 kPa. Reduction of pressure in the enclosure may facilitate evaporation of vapor condensed on the surfaces of the plates of the second heat exchanger. The evaporation of vapor cools the coolant flowing through the tubes of the second heat exchanger. For example, the coolant in the second heat exchanger may be cooled to a range of approximately 5° C. to 7° C., due to evaporation of refrigerant from the tubes of the second heat exchanger as it is adsorbed at the adsorbent coating of the plates of the first heat exchanger. The cooled coolant then circulates between the tubes of the second heat exchanger and the A/C core. As the cooled coolant from the second heat exchanger flows through the A/C core, the cooled coolant may cool the air-cooling fins of the A/C core by heat transfer. Ambient air or recirculated air may then be blown through the A/C core by the blower and cooled by the air-cooling fins. Further, the flow of cooled coolant through the A/C core may freeze the PCM stored in the PCM compartments of the A/C core. Therefore, due to heat transfer between the coolant and the air-cooling fins, and heat transfer between the coolant and the PCM, the cooled coolant flowing through the A/C core may be warmed. For example, temperature of the coolant entering the A/C core may be at approximately 5° C. and the temperature of the coolant exiting the A/C core may be greater than approximately 5° C. The warmed coolant may be recirculated into the second heat exchanger for cooling.

In this way, adsorption of refrigerant vapors at the first heat exchanger may facilitate evaporation of refrigerant from the surface of the second heat exchanger, the intense evaporation cooling the coolant flowing through the tubes of the second heat exchanger. The cooled coolant may then be utilized for cooling the air-cooling fins of the A/C core, which may provide cooling (e.g., to a vehicle cabin) as ambient or recirculated air is blown through the cooled air-cooling fins of the A/C core by a blower.

In contrast, during the desorbing/condensing mode of the A/C system which is depicted in FIG. 5B, refrigerant vapor may be desorbed from the adsorbent coating of the plates of the first heat exchanger. During this mode, the controller may control the first heat exchanger inlet and outlet valves to circulate coolant between the first heat exchanger and the heat source. This coolant loop is depicted by dashed lines, as indicated in the legend. The heat source may be a stable heat source such as an exhaust heat recovery system, and it may heat coolant to approximately 130° C., for example. As the heated coolant circulates into the first heat exchanger, the adsorbent-coated plates of the first heat exchanger may release or desorb the refrigerant vapor into the enclosure housing the heat exchangers. Consequently, the absolute pressure in the enclosure may increase such that it is within a range of approximately 12-20 kPa.

The increase in absolute pressure in the enclosure may cause refrigerant to condense onto the plates of the second heat exchanger. This condensation may generate heat at the plates, which may be transferred to the coolant flowing through the tubes thermally coupled with the plates. As a result, the temperature of the coolant flowing through the tubes of the second heat exchanger may increase. During this mode, the controller may control the second heat exchanger inlet and outlet valves and activate pump 222 such that coolant may circulate between the tubes of the second heat exchanger and the radiator (in the direction indicated by the arrow on pump 222). Thus, during the desorbing/condensing mode, the second heat exchanger is decoupled from and does not fluidly communicate with the A/C core, and instead is coupled with and fluidly communicates with the radiator. Coolant circulating between the second heat exchanger and the radiator is represented by a solid line and the coolant circulating in this loop may be at a temperature of approximately 45° C., as indicated in the legend. It will be appreciated that at this time, coolant in the A/C core (and any coolant remaining in the conduits leading to the A/C core) may remain stagnant.

At the radiator, the warmed coolant (due to heat of condensation) from the second heat exchanger may be cooled by rejecting heat to the environment as the fan pushes air through the radiator. As a result, the coolant exiting the radiator (via the radiator outlet) may be at a lower temperature relative to the coolant entering the radiator.

During desorbing mode, the vehicle cabin may be cooled by blowing recirculated or ambient air through the A/C core. Air cooling at the A/C core may be accomplished via heat exchange between melting PCM and the air being blown through the A/C core, as discussed above with respect to FIG. 4.

In this way, the A/C core with PCM may be utilized to provide cooling during the desorbing/condensing mode. For example, whereas conventional systems which include two pairs of heat exchangers alternating between adsorbing and desorbing modes may provide cooling to a vehicle cabin or other space via an adsorbing heat exchanger pair while the other heat exchanger pair is operated in the desorbing mode, the A/C system described herein may provide cooling during the desorbing mode of its heat exchanger pair without the need for a second heat exchanger pair, via heat exchange between air blown through the A/C core and melting PCM.

FIG. 6 shows an example method 600 for operation of an A/C system (e.g. A/C system 200 of FIG. 2). Method 600 may begin when the A/C system is turned on and end when the A/C system is turned off, in one example. The A/C system may be turned on and off based on user input (e.g., vehicle operator or passenger input when the A/C system is used in a motor vehicle), or automatically turned on and off, for example by a vehicle control system based on engine operating conditions and ambient conditions, among other factors.

At 602, method 600 includes determining a desired A/C system mode. For example, as described above, the A/C system may be operated in an adsorbing mode or a desorbing mode, and thus determining the desired A/C system mode may include determining whether to operate in the adsorbing mode or the desorbing mode. In one example, the determination may be based on a current state of the A/C system, the current state determined by the control system based on previous operation of the A/C system (e.g., the most recent operating mode of the A/C system) and/or based on signals received from sensors (e.g., the signals indicating an estimation of an amount of vapor adsorbed at adsorbent-coated plates of the first heat exchanger and/or an estimation of an amount of vapor condensed at non-adsorbent-coated plates of the second heat exchanger).

After 602, method 600 proceeds to 604. At 604, method 600 includes determining adsorbing and desorbing mode completion parameters. Adsorbing and desorbing mode completion parameters may include a predetermined duration for each mode. For example, the predetermined duration for each mode may be 5-10 minutes. The predetermined duration may be the same for both modes, or each mode may have a different predetermined duration. The control system may determine the predetermined duration for each mode based on engine operating parameters and/or signals received from sensors. Alternatively or additionally, adsorbing and desorbing mode completion parameters other than duration may be determined. For example, completion of the adsorbing or desorbing mode may be determined based on signals from one or more sensors arranged in the A/C system.

After 604, method 600 proceeds to 606. At 606, method 600 includes operating the A/C system in the desired mode (e.g., the desired mode determined at 602) in accordance with the methods shown in FIGS. 7 and 8. For example, if the desired mode is the adsorbing mode, operating the A/C system in the desired mode may include performing the method of FIG. 7. Alternatively, if the desired mode is the desorbing mode, operating the A/C system in the desired mode may include performing the method of FIG. 8.

After 606, method 600 proceeds to 608. At 608, method 600 includes determining whether the A/C system has been turned off (e.g., turned off via user input or turned off automatically by the control system).

If the answer at 608 is YES, indicating that the A/C system has been turned off, method 600 proceeds to 614. At 614, method 600 includes performing a shutdown procedure of the A/C system. In one non-limiting example, the shutdown procedure may include switching from adsorbing mode to desorbing mode, or remaining in desorbing mode if the system is already operating in desorbing mode, so as to desorb all vapor from the adsorbent material in order to begin operation of the A/C system in the adsorbing mode at a subsequent activation of the A/C system. After 614, method 600 ends.

Returning to 608, if the answer is NO indicating that the A/C system has not been turned off, method 600 proceeds to 610 to determine whether the current mode (e.g., adsorbing or desorbing, as determined at 602) is completed. The determination of whether the mode is completed may be based on the mode completion parameters determined at 604. For example, in examples where the mode completion parameters are predetermined durations, the control system may determine that the current mode is completed when the predetermined duration for that mode has elapsed.

If the answer at 610 is NO, method 600 returns to 608. Otherwise, if the answer at 610 is YES, method 600 proceeds to 612. At 612, method 600 includes switching the desired mode from adsorbing to desorbing, or from desorbing to adsorbing. After 612, method 600 returns to 606. Thus, in accordance with method 600, the A/C system cycles between the adsorbing and desorbing modes until the A/C system is turned off, at which point it may perform a shutdown procedure.

FIG. 7 shows an example method 700 for operating an A/C system (e.g. A/C system 124 shown in FIG. 1) in an adsorbing mode. Method 700 may be performed at step 606 of method 600 when the desired mode is the adsorbing mode, for example.

At 702, method 700 includes controlling the first heat exchanger inlet valve (e.g., valve 214 of FIG. 2) to couple the first heat exchanger inlet with the radiator outlet, and controlling the first heat exchanger outlet valve (e.g., valve 216 of FIG. 2) to couple the first heat exchanger outlet with the radiator inlet. Coupling the inlet and outlet of the first heat exchanger with the outlet and inlet of the radiator, respectively, may allow coolant to circulate between the first heat exchanger and the radiator.

After 702, method 700 proceeds to 704. At 704, method 700 includes controlling the second heat exchanger inlet valve (e.g., valve 220 of FIG. 2) to couple the second heat exchanger inlet with A/C core outlet, and controlling the second heat exchanger outlet valve (e.g., valve 218 of FIG. 2) to couple the second heat exchanger outlet with A/C core inlet. Coupling the inlet and outlet of the second heat exchanger with the A/C core outlet and inlet, respectively, may allow coolant to circulate between the second heat exchanger and the A/C core.

After 704, method 700 proceeds to 706. At 706, method 700 includes activating the first pump (e.g., pump 222 of FIG. 2) to effect circulation of coolant between the first heat exchanger and the radiator. Activating the first pump may include taking no action if the first pump is already active, whereas if the first pump is currently deactivated, activating the first pump may include the control system controlling an actuator to effect activation of the first pump if the first pump is currently deactivated. In the activated state, the first pump may induce coolant flow between one or more coolant passages within the radiator and the adsorbent-coated plates of the first heat exchanger.

After 706, method 700 proceeds to 708. At 708, method 700 includes activating the radiator fan). Further, method 700 includes directing ambient or recirculated air to the radiator and blowing the air through the radiator with the fan to cool the coolant from the first heat exchanger threshold below a first threshold. After the radiator cools the coolant below the first threshold, the cooled coolant is pumped back to the first heat exchanger, where it effects adsorption of vapor at the adsorbent-coated plates of the first heat exchanger. For example, the first threshold may correspond to a temperature below which adsorption of vapor at the adsorbent coating of the plates of the first heat exchanger may occur. In an embodiment where the adsorbent coating comprises zeolite pellets, the first threshold may be a temperature corresponding to a summer ambient temperature, for example a temperature in the range of 30-45° C., for example. Adsorption of vapor in the adsorbent coating of the plates generates heat which is transferred to the coolant flowing through the tubes, warming coolant. For example, the coolant may be warmed by approximately 5° C.; thus, in an example where coolant enters the first heat exchanger at 35° C., the coolant will be heated by a few degrees before recirculating to the radiator. At the radiator, the warmed coolant is cooled via rejection of heat to the environment as the radiator fan blows air through the radiator, for example by approximately 5° C. so as to re-enter the first heat exchanger at a temperature which will effect adsorption.

After 708, method 700 proceeds to 710. At 710, method 700 includes activating the second pump (e.g., second pump 224 of FIG. 2) to effect circulation of coolant between the second heat exchanger and the A/C core. At this time, suction generated by the adsorbent materials of the first heat exchanger vapor causes evaporation of vapor condensed on the non-adsorbent-coated plates of the second heat exchanger, the evaporated vapor being adsorbed at the adsorbent coating of the plates of the first heat exchanger. The evaporation of the condensed vapor has a cooling effect on the coolant circulating in the tubes of the second heat exchanger, such that coolant from the A/C core is cooled as it passes through the tubes of the second heat exchanger. For example, the cooled coolant leaving the second heat exchanger may be at a temperature of approximately 5° C. As it flows through the A/C core, the cooled coolant may freeze (e.g., solidify) the phase changing materials in the A/C core. The transfer of heat between the coolant and the phase changing materials may warm the coolant, such that it is warmer (e.g., approximately 7° C.) when it leaves the A/C core.

After 710, method 700 proceeds to 712. At 712, method 700 includes activating the A/C core blower, directing ambient or recirculated air to the A/C core, and blowing the air through the A/C core with the blower. As described above, during the adsorbing mode, coolant circulating between the second heat exchanger and the A/C core is cooled in the second heat exchanger by evaporation of vapor from the non-adsorbent coated plates of the second heat exchanger. Heat transfer between the cooled coolant and the air blown through the A/C core cools the air (e.g., which is then directed into the passenger cabin when the A/C system is incorporated in a motor vehicle). Accordingly, heat transfer between coolant flowing through the A/C core and air blown through the A/C core, in addition to heat transfer between the coolant and the phase changing materials in the A/C core, may contribute to the warming of the coolant that occurs in the A/C core. After 712, method 700 ends.

FIG. 8 shows an example method 800 for operating an A/C system (e.g. A/C system 124 shown in FIG. 1) in a desorbing mode. Method 800 may be performed at step 606 of method 600 when the desired mode is the desorbing mode, for example.

At 802, method 800 includes controlling the first heat exchanger inlet valve (e.g., valve 214 of FIG. 2) to couple the first heat exchanger inlet with an outlet of a heat source, and controlling the first heat exchanger outlet valve (e.g., valve 216 of FIG. 2) to couple the first heat exchanger outlet with the an inlet of the heat source. For example, in embodiments where the A/C system is used to cool a passenger cabin of a motor vehicle, the heat source may be an engine waste heat recovery system. Coupling of the first heat exchanger with the heat source may enable circulation of coolant between the first heat exchanger and the heat source. The heat source may heat coolant above a second threshold, which may correspond to a temperature above which desorption of vapor from the adsorbent materials in the first heat exchanger occurs. In one non-limiting example, the second threshold may be in the range of 130 to 170° C., depending on the design and capabilities of the heat source. Accordingly, the flow of coolant heated above the second threshold into the first heat exchanger may effect desorption of vapor from the adsorbent coating of the plates of the first heat exchanger.

After 802, method 800 proceeds to 804. At 804, method 800 includes controlling the second heat exchanger inlet valve (e.g., valve 220 of FIG. 2) to couple the second heat exchanger inlet with the radiator outlet, and controlling the second heat exchanger outlet valve (e.g., valve 218 of FIG. 2) to couple the second heat exchanger outlet with the radiator inlet. Coupling the inlet and outlet of the second heat exchanger with radiator outlet and inlet, respectively, may allow coolant to circulate between the second heat exchanger and the radiator.

After 804, method 800 proceeds to 806. At 806, method 800 includes deactivating the second pump and activating the first pump. Deactivating the second pump may include taking no action if the second pump is already deactivated, or if the second pump is currently activated, deactivating the second pump may include the control system controlling an actuator to effect deactivation of the second pump. Similarly, activating the first pump may include taking no action if the first pump is already active, or may include the control system controlling an actuator to effect activation of the first pump if the first pump is currently deactivated. The activation of the first pump induces circulation of coolant between the radiator and the second heat exchanger, which is coupled thereto during the desorbing mode as described above with respect to step 802. Deactivation of the second pump is appropriate as the second heat exchanger and the A/C core are decoupled and do not communicate during the desorbing mode; instead, during the desorbing mode, coolant in the passages which connect the second heat exchanger outlet and inlet with the A/C core inlet and outlet, respectively, during the adsorbing mode, as well as coolant in the A/C core itself, remains stagnant. Meanwhile, circulation of coolant between the heat source and the first heat exchanger results in desorption of vapor from the adsorbent materials in the first heat exchanger. The desorbed vapor condenses on plates of the non-adsorbent-coated plates of the second heat exchanger; this condensation generates heat at the plates of the non-adsorbent-coated plates of the second heat exchanger, which is exchanged with coolant flowing through the second heat exchanger. The heat exchange warms the coolant flowing through the second heat exchanger, and thus the coolant flows from the second heat exchanger back to the radiator at a warmer temperature relative to the temperature of coolant entering the second heat exchanger from the radiator.

After 806, method 800 proceeds to 808. At 808, method 800 includes activating the radiator fan. Further, method 800 includes directing ambient or recirculated air to the radiator and blowing the air through the radiator with the fan to cool the warmed coolant from the second heat exchanger. Accordingly, heat generated by condensation in the second heat exchanger which is subsequently transferred to coolant flowing through the heat exchanger may be dissipated when the warmed coolant is circulated back to the radiator via heat exchange with air blown through the radiator.

After 808, method 800 proceeds to 810. At 810, method 800 includes activating the A/C core blower, directing ambient or recirculated air to the A/C core, and blowing the air through the A/C core with the blower. As described above, during the desorbing mode, any coolant that remains in the passages leading to the A/C core, and in the A/C core itself, remains stagnant and does not circulate. As described above, during the desorbing mode, the ambient or recirculated air blown through the A/C core exchanges heat with melting PCM in the PCM compartments, such that cool air may be provided by the A/C system during the desorbing mode. After 812, method 800 ends.

In another representation, a method for controlling an A/C system may include selectively controlling respective inlet and outlet valves of a first heat adsorbent-containing heat exchanger and a second non-adsorbent-containing heat exchanger and first and second pumps to either circulate coolant between the first heat exchanger and a heat source and between the second heat exchanger and a radiator while fluidly decoupling a core containing phase changing materials from the second heat exchanger, or to circulate coolant between the first heat exchanger and the radiator and between the second heat exchanger and the core.

Note that the example control and estimation routines included herein can be used with various engine and/or vehicle system configurations. The specific routines described herein may represent one or more of any number of processing strategies such as event-driven, interrupt-driven, multi-tasking, multi-threading, and the like. As such, various acts, operations, or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated acts or functions may be repeatedly performed depending on the particular strategy being used. Further, the described acts may graphically represent code to be programmed into the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and nonobvious combinations and subcombinations of the various systems and configurations, and other features, functions, and/or properties disclosed herein.

The following claims particularly point out certain combinations and subcombinations regarded as novel and nonobvious. These claims may refer to "an" element or "a first" element or the equivalent thereof. Such claims should be understood to include incorporation of one or more such elements, neither requiring nor excluding two or more such elements. Other combinations and subcombinations of the disclosed features, functions, elements, and/or properties may be claimed through amendment of the present claims or through presentation of new claims in this or a related application.

Such claims, whether broader, narrower, equal, or different in scope to the original claims, also are regarded as included within the subject matter of the present disclosure.

The invention claimed is:

1. A vehicle air-conditioning system for cooling a vehicle cabin, comprising:
   an adsorption heat pump driven by an engine waste heat recovery system, the heat pump comprising a first adsorbing/desorbing heat exchanger, a second evaporating/condensing heat exchanger, a radiator, and an air-conditioning core, the first and second heat exchangers arranged inside a vacuum enclosure and thermally coupled via vapor,
   wherein the air-conditioning core contains a plurality of double tube plates, each double tube plate comprising an inner tube arranged within an outer tube, with phase changing materials surrounding the inner tube within the outer tube, wherein the inner tube of each plate selectively fluidly communicates with one or more tubes of a tube-and-plate assembly of the second heat exchanger depending on a mode of the system; and
   a controller comprising a processor and a storage medium programmed with computer readable data representing instructions executable by the processor to, during a desorbing/condensing mode in which the inner tubes of the air-conditioning core are fluidly decoupled from the system, actuate a blower to cool a vehicle passenger cabin by blowing air through the air-conditioning core into the cabin as the phase changing materials in the air-conditioning core melt.

2. The system of claim 1, wherein the tube-and-plate assembly of the second heat exchanger is a second tube-and-plate assembly, and wherein the first heat exchanger comprises a first tube-and-plate assembly, the first tube-and-plate assembly comprising one or more tubes and a plurality of adsorbent-coated plates thermally coupled with the tubes, and wherein depending on the mode of the system, the tubes of the first heat exchanger are fluidly coupled with either the waste heat recovery system or the radiator, and the tubes of the second heat exchanger are fluidly coupled with either the radiator or the air-conditioning core.

3. The system of claim 1, wherein the system does not include an engine-driven compressor, a dedicated evaporator, or a dedicated condenser.

4. The system of claim 1, wherein the first and second heat exchangers are the only pair of heat exchangers in the system.

5. The system of claim 1, wherein the first and second heat exchangers are stacked vertically within the enclosure.

6. The system of claim 1, wherein the first and second heat exchangers are arranged side by side within the enclosure.

7. The system of claim 2, wherein during an adsorbing/evaporating mode, the tubes of the first heat exchanger fluidly communicate with the radiator while the tubes of the second heat exchanger fluidly communicate with the inner tubes of the air-conditioning core, and wherein during the desorbing/condensing mode, the tubes of the first heat exchanger fluidly communicate with the waste heat recovery system while the tubes of the second heat exchanger fluidly communicate with the radiator.

8. The system of claim 7, wherein the air-conditioning core further comprises segments containing air-cooling fins, each segment arranged between and thermally coupled with two of the double tube plates.

9. An air-conditioning system, comprising:
   first and second tube-and-plate heat exchangers thermally coupled by vapor inside a vacuum enclosure;
   a first coolant loop comprising adsorbent-coated plates of the first heat exchanger and either a heat source or a radiator depending on an operating mode of the air-conditioning system;
   a second coolant loop comprising non-adsorbent-coated plates of the second heat exchanger and either the radiator or an air-conditioning core containing phase changing materials, depending on the operating mode; and
   a controller comprising a processor and a storage medium programmed with computer readable data representing instructions executable by the processor to, during a desorbing/condensing mode in which the inner tubes of the air-conditioning core are fluidly decoupled from the system, actuate a blower to cool a vehicle passenger cabin by blowing air through the air-conditioning core into the cabin as the phase changing materials in the air-conditioning core melt.

10. The system of claim 9, wherein during the desorbing/condensing mode, the first coolant loop comprises the heat source and the second coolant loop comprises the radiator, and wherein during an adsorbing/evaporating mode, the first coolant loop comprises the radiator and the second coolant loop comprises the air-conditioning core.

11. The system of claim 9, wherein the system does not include a compressor, a dedicated evaporator, or a dedicated condenser.

12. The system of claim 9, wherein the first and second heat exchangers are the only pair of heat exchangers in the system.

13. The system of claim 9, wherein one or more inner tubes of the air-conditioning core selectively fluidly communicate with one or more tubes of the second heat exchanger depending on the operating mode.

14. A method for a vehicle air-conditioning system, comprising:

during engine operation, alternating between a desorbing/condensing mode comprising circulating coolant between a waste heat recovery system and a first heat exchanger while circulating coolant between a radiator and a second heat exchanger and an adsorbing/evaporating mode comprising circulating coolant between the radiator and the first heat exchanger while circulating coolant between an air-conditioning core comprising phase changing materials and the second heat exchanger, wherein the desorbing/condensing mode further comprises cooling a vehicle passenger cabin by blowing air through the air-conditioning core into the cabin as the phase changing materials in the air-conditioning core melt, and wherein in the desorbing/condensing mode, inner tubes of the air-conditioning core are fluidly decoupled from the system.

15. The method of claim 14, wherein the first and second heat exchangers are tube-and-plate heat exchangers arranged in a common vacuum enclosure and thermally coupled by vapor, wherein circulating coolant in the first heat exchanger comprises circulating coolant in one or more tubes of the first heat exchanger which are thermally coupled with adsorbent-coated plates of the first heat exchanger, and wherein circulating coolant in the second heat exchanger comprises circulating coolant in one or more tubes of the second heat exchanger which are thermally coupled with non-adsorbent-coated plates of the second heat exchanger.

16. The method of claim 15, wherein during the desorbing mode, vapor desorbs from the adsorbent-coated plates of the first heat exchanger and condenses on the non-adsorbent-coated plates of the second heat exchanger while the phase changing materials in the air-conditioning core release thermal energy, and wherein during the adsorbing mode, vapor evaporates from the non-adsorbent-coated plates of the second heat exchanger and is adsorbed at the adsorbent-coated plates of the first heat exchanger while the phase changing materials in the air-conditioning core store thermal energy.

17. The method of claim 16, further comprising:

during the desorbing mode, controlling inlet and outlet valves of the first heat exchanger to fluidly couple the first heat exchanger with the waste heat recovery system while fluidly decoupling the first heat exchanger and the radiator, and controlling inlet and outlet valves of the second heat exchanger to fluidly couple the second heat exchanger with the radiator while fluidly decoupling the second heat exchanger and the air-conditioning core;

during the adsorbing mode, controlling the inlet and outlet valves of the first heat exchanger to fluidly couple the first heat exchanger with the radiator while fluidly decoupling the first heat exchanger and the waste heat recovery system, and controlling the inlet and outlet valves of the second heat exchanger to fluidly couple the second heat exchanger with the air-conditioning core while fluidly decoupling the second heat exchanger and the radiator.

18. The method of claim 17, further comprising:

during the desorbing mode, activating a first pump arranged in series with an outlet of the radiator while deactivating a second pump arranged in series with an inlet of the air-conditioning core; and during the adsorbing mode, activating both the first pump and the second pump.

19. The method of claim 14, further comprising:

during the adsorbing mode, cooling the cabin by blowing air across the air-conditioning core as coolant, cooled by evaporation of vapor condensed on plates of a tube-and-plate assembly of the second heat exchanger, circulates between the second heat exchanger and the air-conditioning core.

20. The method of claim 14, wherein the vehicle air-conditioning system does not include a dedicated evaporator and condenser.

* * * * *